United States Patent
Matumura et al.

(10) Patent No.: US 8,010,713 B2
(45) Date of Patent: Aug. 30, 2011

(54) STORAGE SYSTEM, STORAGE APPARATUS, AND METHOD FOR HOT SWAPPING OF FIRMWARE

(75) Inventors: Tadashi Matumura, Kawasaki (JP); Masahiro Yoshida, Kawasaki (JP); Taichi Ohno, Matsuyama (JP)

(73) Assignee: Fujitsu Limited, Kawasaki (JP)

( * ) Notice: Subject to any disclaimer, the term of this patent is extended or adjusted under 35 U.S.C. 154(b) by 71 days.

(21) Appl. No.: 12/548,024

(22) Filed: Aug. 26, 2009

(65) Prior Publication Data

US 2009/0319702 A1 Dec. 24, 2009

Related U.S. Application Data

(63) Continuation of application No. PCT/JP2007/055422, filed on Mar. 16, 2007.

(51) Int. Cl.
*G06F 3/00* (2006.01)
*G06F 13/00* (2006.01)

(52) U.S. Cl. ............ 710/8; 710/5; 710/15; 710/33; 710/52

(58) Field of Classification Search .......... None
See application file for complete search history.

(56) References Cited

U.S. PATENT DOCUMENTS

| | | | | |
|---|---|---|---|---|
| 2002/0138567 A1* | 9/2002 | Ogawa | ............... | 709/203 |
| 2005/0071837 A1* | 3/2005 | Butt et al. | ............... | 717/168 |
| 2005/0172057 A1 | 8/2005 | Suzuki et al. | | |
| 2005/0188126 A1 | 8/2005 | Mashima et al. | | |
| 2005/0193228 A1 | 9/2005 | Miki | | |

FOREIGN PATENT DOCUMENTS

| | | |
|---|---|---|
| JP | 2005-078595 | 3/2005 |
| JP | 2005-215943 | 8/2005 |
| JP | 2005-242574 | 9/2005 |
| JP | 2005-251188 | 9/2005 |
| JP | 2006-185312 | 7/2006 |

OTHER PUBLICATIONS

Barry Barnett, Multi-path IO for AIX 5L Version 5.2, Oct. 11, 2002, IBM Corporation, [online, accessed on Jun. 4, 2011], URL: http://et.aset.psu.edu/working_notes/storage/iSCSI/docs/IBM_iSCSI_multi_path.pdf.*
International Search Report for PCT/JP2007/055422, mailed Jun. 26, 2007.

* cited by examiner

*Primary Examiner* — Tariq Hafiz
*Assistant Examiner* — Scott Sun
(74) *Attorney, Agent, or Firm* — Staas & Halsey LLP

(57) ABSTRACT

A storage system includes a host and a storage apparatus. The host having multiple paths connecting with the storage apparatus transfers path identification information received from the storage apparatus, to the storage apparatus via all paths other than a path through which the path identification information has been transmitted. The storage apparatus includes a table for storing the path identification information transmitted to the host and path tables for storing the path identification information received from the host. When the storage apparatus receives a request for replacing the firmware, it determines whether the path tables are matched by comparing the path tables with each other. If the path tables are matched, the storage apparatus sequentially replaces the firmware corresponding to the multiple paths in a hot swapping manner.

7 Claims, 18 Drawing Sheets

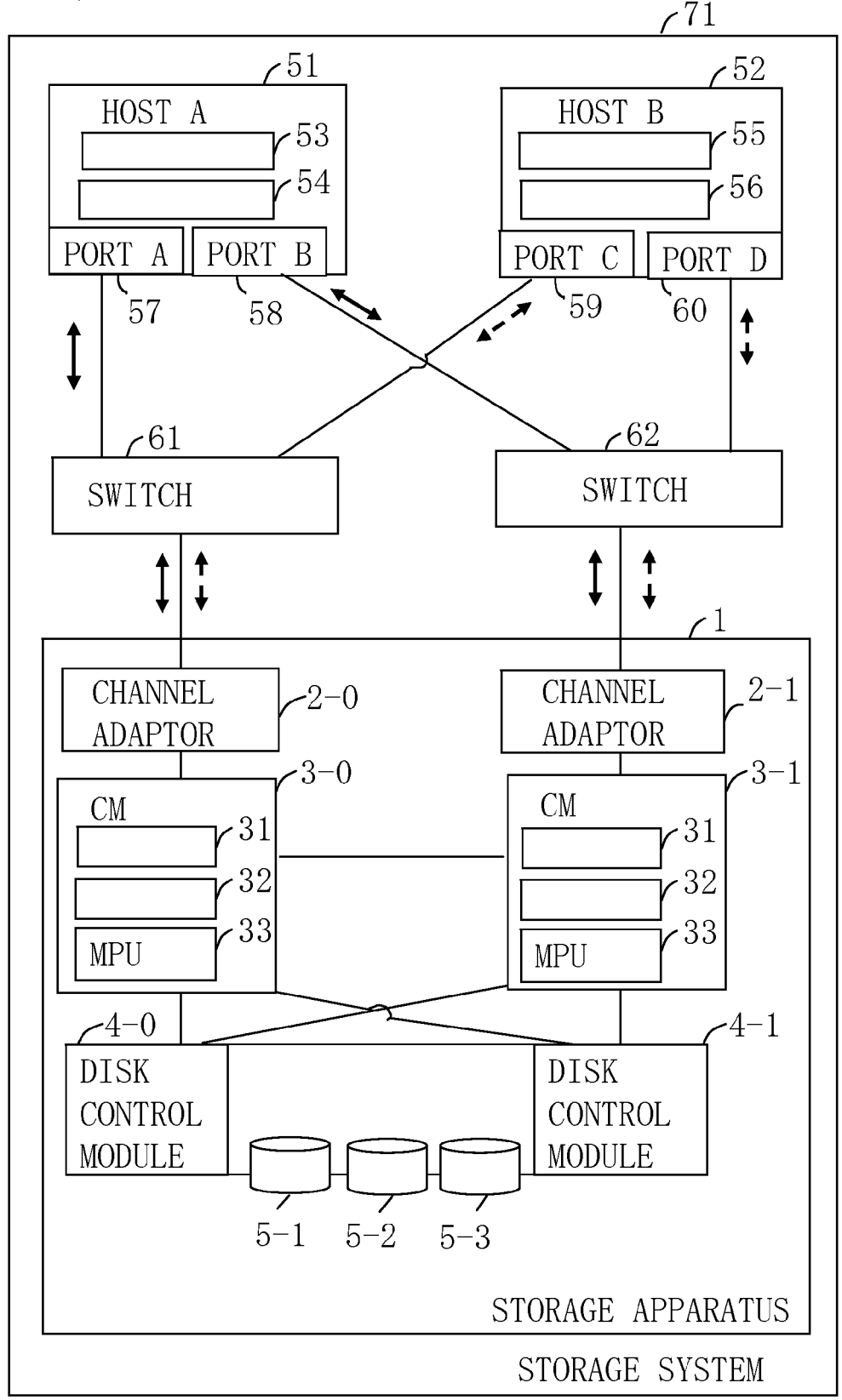

FIG. 4A

| NO | WWN | SND-ID (CM3-0) | RCV-ID (CM3-1) 14-0 |
|---|---|---|---|

| NO | WWN | RCV-ID (CM3-0) | SND-ID (CM3-1) 14-1 |
|---|---|---|---|

FIG. 4B

| NO | WWN | SND-ID (CM3-0) | RCV-ID (CM3-1) 14-0 |
|---|---|---|---|
| 1 | WWN-A | 1001 | — |

| NO | WWN | RCV-ID (CM3-0) | SND-ID (CM3-1) 14-1 |
|---|---|---|---|
| 1 | — | — | — |

FIG. 4C

| NO | WWN | SND-ID (CM3-0) | RCV-ID (CM3-1) 14-0 |
|---|---|---|---|
| 1 | WWN-A | 1001 | — |

| NO | WWN | RCV-ID (CM3-0) | SND-ID (CM3-1) 14-1 |
|---|---|---|---|
| 1 | WWN-B | 1001 | — |

FIG. 5A

| No | WWN | SND-ID (CM3-0) | RCV-ID (CM3-1) |
|---|---|---|---|
| 1 | WWN-A | 1001 | 1101 |
| 2 | WWN-C | 1002 | 1102 |

14-0

| No | WWN | RCV-ID (CM3-0) | SND-ID (CM3-1) |
|---|---|---|---|
| 1 | WWN-B | 1001 | 1101 |
| 2 | WWN-D | 1002 | 1102 |

| No | WWN | SND-ID (CM3-0) | RCV-ID (CM3-1) |
|---|---|---|---|
| 1 | WWN-A | — | — |
| 2 | WWN-C | 1002 | 1102 |

14-0

| No | WWN | RCV-ID (CM3-0) | SND-ID (CM3-1) |
|---|---|---|---|
| 1 | WWN-B | 1001 | 1101 |
| 2 | WWN-D | 1002 | 1102 |

14-1

STORAGE SYSTEM, STORAGE APPARATUS, AND METHOD FOR HOT SWAPPING OF FIRMWARE

CROSS-REFERENCE TO RELATED APPLICATIONS

This is continuation of Application PCT/JP2007/055422, filed on Mar. 16, 2007, the entire contents of which are incorporated herein by reference.

FIELD

The embodiment discussed herein is related to hot swapping of firmware installed on a storage apparatus connected to a host.

BACKGROUND

A storage system includes a host and a storage apparatus connected to the host. The storage apparatus may be connected to multiple hosts. If the storage apparatus includes multiple control modules (hereafter referred to as "CMs") each including a piece of firmware and the pieces of firmware are replaced in a hot swapping manner, the CMs are divided into the first part and latter part and these parts separately perform firmware replacement. For example, if the storage apparatus includes four CMs, first, two of the four CMs perform firmware replacement simultaneously. Then, the remaining two CMs perform firmware replacement. The storage apparatus and the host are connected via multiple paths and each path is connected to a corresponding CM. Thus, the firmware is replaced in a hot swapping manner without having to stop operation. Hereafter, an example in which hot swapping firmware replacement is performed in a unit including two CMs will be explained.

FIGS. 1A to 1G are diagrams illustrating firmware replacement according to a related-art example. FIG. 1A to 1D are a diagram illustrating a case where firmware is replaced normally according to a related-art example. This storage system includes a host and a storage apparatus having two paths connected to the host. As illustrated in FIG. 1A, in a normal state, data is transferred from the host to the storage apparatus via one path. Another path is on standby.

As illustrated in FIG. 1B, during replacement of firmware installed on the first part (CM0), data is transferred between the host and storage apparatus via a path connected to the latter part, CM1.

As illustrated in FIG. 1C, during replacement of firmware installed on the latter part (CM1), data is transferred between the host and storage apparatus via the path connected to the CM0 that has performed the firmware replacement.

As illustrated in FIG. 1D, upon completion of the firmware replacement in the latter part (CM1), data is transferred via the path connected to the CM0.

FIG. 1E to 1G are a diagram illustrating a case where an abnormality occurs during replacement of firmware according to a related-art example. If there is an abnormality in one path and if firmware is replaced in a hot swapping manner via another normal path, none of the paths between the storage apparatus and the host can be used as a path for processing an operation. Therefore, the operation stops. FIG. 1E illustrates examples where there is already a failure in the connectivity of the path connected to the latter part, CM1, when firmware replacement is started in the first part, CM0.

As illustrated in FIG. 1E, an abnormality has already occurred in the path connected to the latter part (CM1) before firmware is replaced. Data is being transferred by the CM0.

As illustrated in FIG. 1F, when firmware replacement is started in the first part (CM0), data can no longer be transferred via the path connected to the CM0.

As illustrated in FIG. 1G, since data can be transferred via none of the paths, the host detects an error so that the operation stops. The same goes for a case where there is already a failure in the connectivity of the path connected to the first part, CM0, when firmware replacement is started in the latter part, CM1. As is understood from the above description, if operation may stop when replacing firmware in a hot swapping manner, first, the cause of the abnormality in the path must be eliminated and then the firmware must be replaced.

For this reason, in the related art, before performing firmware replacement on the first part, the maintenance worker logs in to the host in order to issue a command to check the connectivity of the path between the storage apparatus and host. If there is no abnormality, the maintenance worker performs firmware replacement on the first part. Also, before performing firmware replacement on the latter part, the maintenance worker conducts the same work. Since this method requires execution of a command, it is necessary to secure a maintenance worker that can log in to the host with the administrator authority when replacing firmware. Also, if a great number of hosts are connected to the storage apparatus that is to perform firmware replacement, it is necessary to execute a command with respect to all the hosts so as to check the connectivity. This disadvantageously puts a heavy load on the maintenance worker. Japanese Laid-open Patent Publication No. 2005-242574 is a related-art example regarding an information processing system for automatically replacing a microprogram installed on a storage unit without having to stop operation.

SUMMARY

According to an aspect of the invention, a storage system includes a host and a storage apparatus including a plurality of pieces of firmware corresponding to a plurality of paths connecting with the host. The host includes a transfer unit for transferring path identification information for checking a path to the storage unit via all paths other than the path that the path identification information has been received from the storage unit. The storage apparatus includes a transmission unit for transmitting the path identification information to the host, a reception unit for receiving the path identification information from the host via the paths other than the path that the path identification information has been transmitted by the transmission unit, a path table memory for storing path tables including the transmitted path identification information and the received path identification information with respect to each of the plurality of paths, a request reception unit for receiving the pieces of firmware for replacement and a request for replacing the pieces of firmware, a determination unit for determining whether the path tables with respect to the plurality of paths are matched with each other, upon receiving the replacement request, and a replacement controller for sequentially replacing the pieces of firmware corresponding to each of the plurality of paths in a hot swapping manner, upon the determination unit determining match of the path tables.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 2 is a diagram illustrating a block diagram of a storage system;

FIGS. 4A to 4C are diagrams illustrating path tables;

FIGS. 5A and 5B illustrate examples of registration in path tables;

DESCRIPTION OF EMBODIMENTS

Figure 1A:
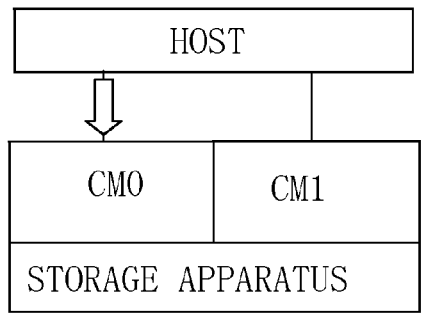
FIGS. 1A to 1G are diagrams illustrating example of conventional firmware replacement.
Figure 1B:
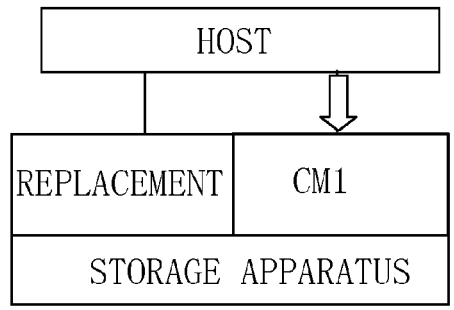
Figure 1C:
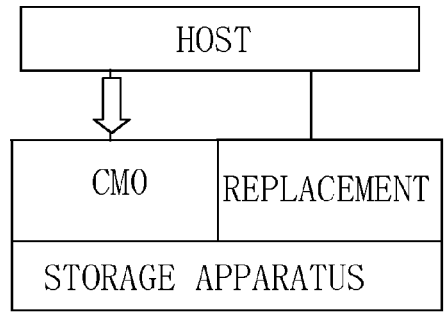
Figure 1D:
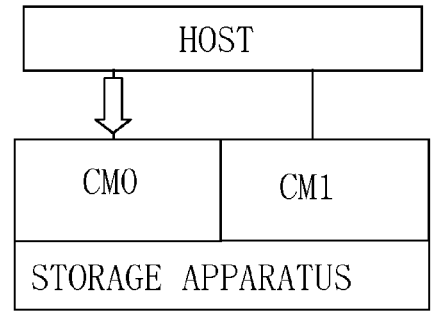
Figure 1E:
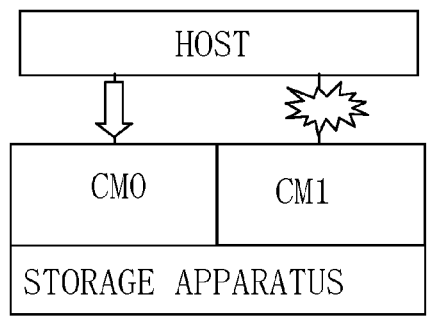
Figure 1F:
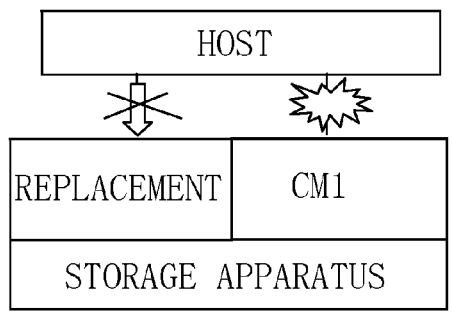
Figure 1G:
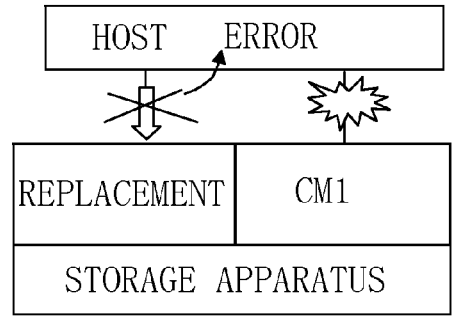

FIG. 2 is diagram illustrating a block diagram of a storage system. A storage system 71 includes, for example, two hosts, A51 and B52, a storage apparatus 1, and switches 61 and 62. In an example illustrated in FIG. 2, the hosts A51 and B52 each have two connection paths.

The host A51 includes a port change control unit A53, an input/output (hereafter referred to as "I/O") control unit A54, a port A57, and a port B58. The host B52 includes a port change control unit B55, an I/O control unit B56, a port C59, and a port D60. The port change control unit A53 changes a connection path between the host A51 and storage apparatus 1 from the main path to the sub-path, and vice versa. The port change control unit B55 changes a connection path between the host B52 and storage apparatus 1 from the main path to the sub-path, and vice versa. The main path refers to an active path, that is, a path through which user data is being transmitted. On the other hand, the sub-path refers to a backup path through which user data is not being transmitted. The main path between the host A51 and storage apparatus 1 is a route that connects the port A57, the switch 61, a channel adaptor 2-0, and a control module (hereafter referred to as "CM") 3-0. The sub-path therebetween is route that connects the port B58, the switch 62, a channel adaptor 2-1, and a CM 3-1. The combination of these connection paths is the default.

On the other hand, the main path between the host B52 and storage apparatus 1 is a route that connects the port D60, switch 62, channel adaptor 2-1, and CM 3-1. The sub-path therebetween is a route that connects the port C59, switch 61, channel adaptor 2-0, and CM 3-0. The combination of these connection paths is the default.

The I/O control unit A54 and I/O control unit B56 as a transfer unit, each control such as reading or writing of data from or into the storage apparatus 1 by issuing an I/O command. I/O commands are, for example, a command of path check information for patrol that is intended to monitor the connection state of the storage apparatus 1 and a write command for writing data into the storage apparatus 1. If the I/O control unit A54 or I/O control unit B56 receives, from the storage apparatus 1, a response to path check information, it extracts a path identification number included in the response. In this case, if the I/O control unit A54 receives the response via the port A57, it adds the path identification information received from the storage apparatus 1 to path check information, which is an I/O command to be issued to the other port, B58, and sends the path check information.

Path check information is a command for checking a path and includes the name of a host, path identification information, a command for reading a particular disk area, a WWN (world wide name), and the like. The I/O control unit A54 and I/O control unit B56 each include a timer for periodically outputting path check information for each path.

The ports A57 to D60 are interface ports for connecting with the storage apparatus 1 via a fibre channel or the like. It is assumed that the WWN of the port A57 is WWN-A, that of the port B58 is WWN-B, that of the port C59 is WWN-C, and that of the port D60 is WWN-D.

The switches 61 and 62 are relay units for connecting the storage apparatus 1 to the host A51 and host B52 via a fibre channel interface or the like.

The storage apparatus 1 includes the channel adapter 2-0, the channel adaptor 2-1, the CM 3-0, the CM 3-1, a disk control module 4-0, a disk control module 4-1, and disks 5-1 to 5-3.

The channel adaptor 2-0 is connected to the switch 61 and controls communications between the hosts A51 and B52 and the storage apparatus 1 as a transmission unit and a reception unit. The channel adaptor 2-1 is connected to the switch 62 and controls communications between the host A51 and B52 and the storage apparatus 1 as the transmission unit and the reception unit.

The disk control modules 4-0 and 4-1 each control reading or writing of data from or into the disks 5-1 to 5-3. The disks 5-1 to 5-3 are units for storing data. The CM 3-0 and CM 3-1 each stores data received from the host A51 or host B52 in the disks 5-1 to 5-3 via the disk control module 4-0 or disk control module 4-1. Also, the CM 3-0 and CM 3-1 each perform control for transmitting data read from the disks 5-1 to 5-3 via the disk control module 4-0 or disk control module 4-1 to the host A51 or B52. Also, the CM 3-0 and CM 3-1 perform such as control of concurrent firmware loading (hereafter referred to as "CFL").

Figure 3:
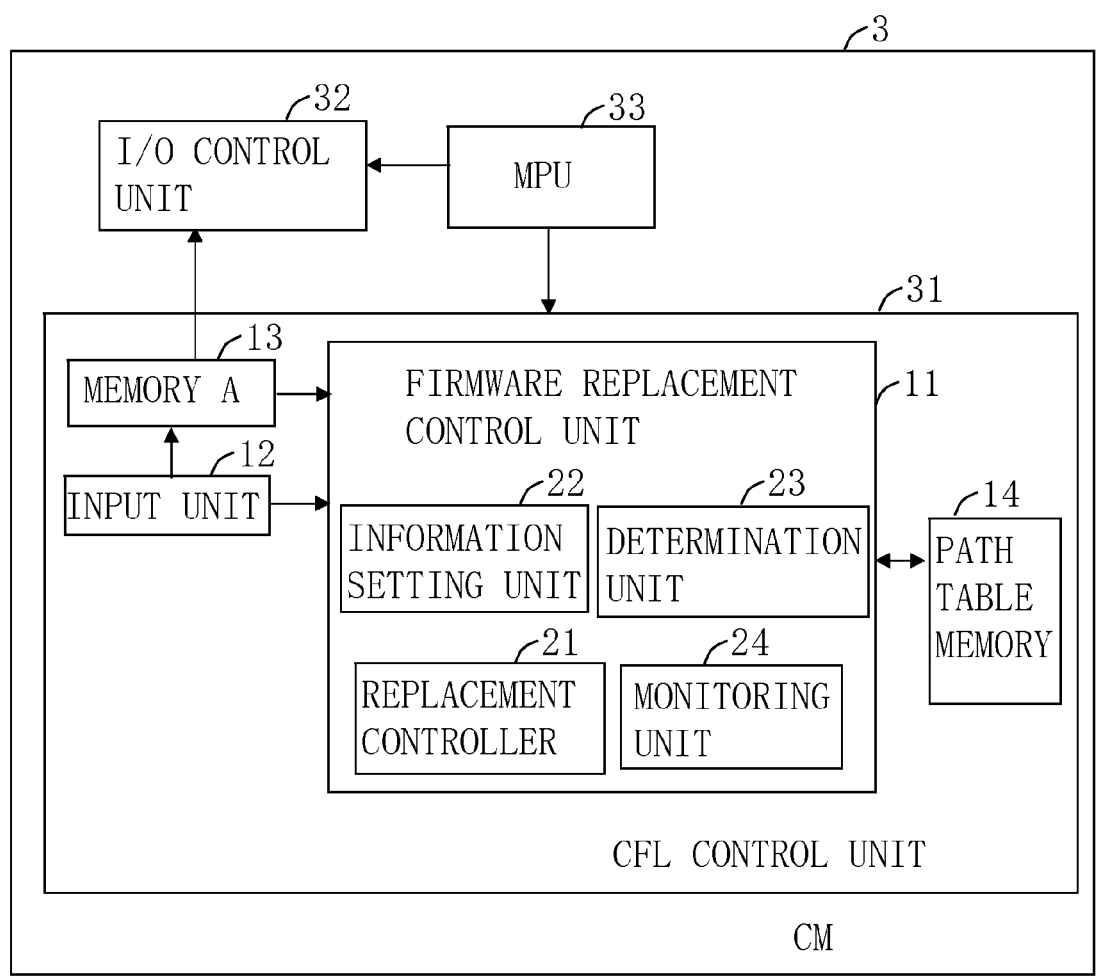
FIG. 3 is a diagram illustrating a block diagram of a control module (CM)

FIG. 3 is a diagram illustrating a block diagram of a CM. CM 3 indicates the CM 3-0 or the CM 3-1. Also, each of CM 3 (3-0, 3-1) includes a CFL control unit 31 and an I/O control unit 32, and a MPU 33.

The CFL control unit 31 replaces firmware with updated version. The CFL is always performed in a state in which a single system of a redundant configuration is assured. For example, when the CM 3-0 is performing a version upgrade of the firmware, the CM 3-1 is placed in a normal state. The CFL control unit 31 includes a firmware replacement control unit 11, an input unit 12, a memory A13, and a path table memory 14 for storing a path table 14-0 and 14-1.

The firmware replacement control unit 11 performs control for automatically replacing the firmware and stores the firmware for firmware replacement control. If the firmware is installed on the channel adapter 2-0 and 2-1 or if the firmware is installed on the disk control module 4-0 and 4-1, the firmware replacement control unit 11 may also replace such firmware. The firmware replacement control unit 11 includes a replacement controller 21, an information setting unit 22, a determination unit 23, and a monitoring unit 24. The replacement controller 21 performs control for performing CFL. The information setting unit 22 makes a setting for adding path identification information, a request for changing the transmission interval, and a request for changing the main path to a response to an I/O command, which is the command of path check information. The host A51 or host B52 may change the path to another when the storage apparatus 1 performs CFL. However, if the storage apparatus 1 sends, to the host A51 or host B52, a request for changing the main path, the path is smoothly changed between the main path and sub-path. The determination unit 23 determines whether the contents of the path table 14-0 of the CM 3-0 and those of the path table 14-1 of the CM 3-1 are matched. The monitoring unit 24 measures the interval of transmission of path check information. When a time-out occurs, the monitoring unit 24 determines that there is an abnormality in the path and deletes the path identification information from the path table 14-0 or the path table 14-1 corresponding to the path that is a subject of monitoring.

The input unit 12 as a request reception unit is connected to a maintenance terminal. When update firmware for replacement is uploaded from the maintenance terminal, the input unit 12 stores the update firmware in the memory A13. Also, when an instruction for replacing the firmware with updated version is inputted from the maintenance terminal, the input unit 12 provides the update instruction to the firmware replacement control unit 11. Upon receipt of the update instruction, the firmware replacement control unit 11 starts the CFL. The memory A13 temporarily stores the update firmware. Before performing an update, this update firmware is transferred to the storage places of the I/O control unit 32 and CFL control unit 31. The path table 14-0 and 14-1 in the path table memory 14 include path identification information about the connection path between the host A51 or host B52 and storage apparatus 1. The I/O control unit 32 performs such as control of read/write of data and stores the firmware for I/O control. The MPU 33 controls the CFL control unit 31 and I/O control unit 32.

FIGS. 4A to 4C are diagrams illustrating path tables. FIG. 4A is a diagram illustrating an example configuration of the path tables. The path table 14-0 of the CM 3-0 stores the WWNs of the port A57 or port C59, SND-ID (information for identifying a transmission path of the CM 3-0), and RCV-ID (information for identifying a reception path of the CM 3-1). On the other hand, the path table 14-1 of the CM 3-1 stores the WWNs of the port B58 and port D60, SND-ID (information for identifying a transmission path of the CM 3-1), and RCV-ID (information for identifying a reception path of the CM 3-0).

FIG. 4B illustrates an example of a registered SND-ID. The CM 3-0 receives path check information from the port A57 of the host A51. The storage apparatus 1 adds path identification information, e.g., "1001" to a response to the path check information and sends the path check information to the host A51. Simultaneously, the storage apparatus 1 stores the WWN-A, which is the number of the port A57, as the WWN and stores "1001" as the path identification information in the path table 14-0 of the CM 3-0. There is nothing registered in the path table 14-1 of the CM 3-1 yet.

FIG. 4C illustrates an example of a registered RCV-ID. The CM 3-1 receives path check information from the port B58 of the host A51. This path check information includes the path identification information "1001" transmitted by the CM 3-0 of the storage apparatus 1. Therefore, the storage apparatus 1 registers the path identification information "1001" extracted from the path check information in the path table 14-1 as the RCV-ID. Also, the storage apparatus 1 registers the WWN-B, which is the WWN number of the port B58, in the path table 14-1 in such a manner that the WWN-B corresponds to the RCV-ID "1001". Thus, the paths among the CM 3-0, host A51, and CM 3-1 are confirmed.

FIGS. 5A and 5B illustrate examples of registration in path tables. FIG. 5A illustrates an example of normal tables. When some time elapses after the host A51 and storage apparatus 1 communicate with each other normally, the path table 14-0 of the CM 3-0 and path table 14-1 of the CM 3-1 are created as illustrated in FIG. 5A. That is, the SND-ID and RCV-ID in the path table 14-0 are matched with the RCV-ID and SND-ID in the path table 14-1, respectively. As a result, it is confirmed on the basis of the path identification information "1001" that the paths among the CM 3-0, host A51, and CM 3-1 are normal. Also, it is confirmed on the basis of the path identification information "1101" that the paths among the CM 3-1, host A51, and CM 3-0 are normal. Also, it is confirmed on the basis of the path identification information "1002" that the paths among the CM 3-0, host B52, and CM 3-1 are normal. Also, it is confirmed on the basis of the path identification information "1102" that the paths among the CM 3-1, host B52, and CM 3-0 are normal. This indicates that the paths are redundant. Therefore, CFL can be performed.

FIG. 5B illustrated an example of tables where an abnormality has occurred in the path. When an abnormality has occurred in the path between the port A57 and CM 3-0, the monitoring unit 24 generates a time-out. As a result, the path identification information corresponding to the WWN-A is deleted from the table.

The outline of the operations will be described referring to FIG. 2 and FIG. 3. Typically, an I/O command issued from the host A51 or host B52 is received by the channel adaptor 2-0 or channel adaptor 2-1 serving as an interface with the storage apparatus 1 via the switch 61 or switch 62 and then passed on to the CM 3-0 or CM 3-1. The CM 3-0 or CM 3-1 analyzes the I/O command. If the I/O command is a read command or write command, the CM 3-0 or CM 3-1 accesses the disks 5-1 to 5-3 via the disk control module 4-0 or disk control module 4-1.

In normal times, the host A51 and host B52 each periodically transmit path check information from the ports A57 to D60. The interval at which the host A51 and host B52 transmit the path check information is an interval long enough not to affect the I/O command for reading or writing normal data. When any of the CMs 3 of the storage apparatus 1 receives the path check information, it registers the path identification information and WWN number in the path table 14-0 or in the path table 14-1, more specifically, in the path table 14-0 retained by the CM 3-0 or the path table 14-1 retained by the CM 3-1. Then, the CM 3 adds generated path identification information to a response to the path check information and transmits the response to the host A51 or host B52. If the CM 3 receives no path check information for a given time after the registration, it determines that an abnormality in the path has caused a time-out and deletes path identification information from the path table 14 or from the path table 14-1.

Also, when the CM 3 receives a request for starting CFL, it checks if there is a failure inside the storage apparatus 1. If there is a failure, the CM 3 does not perform CFL. If not, the CM 3 starts CFL and transmits a request for reducing the interval of transmission of path check information, to the host A51 and host B52. This is done to update the path table 14-0 or path table 14-1 earlier to detect earlier during CFL whether the path is normal or abnormal. Also, if the path connected to the CM 3, which will soon perform to replace the firmware with updated version, is the main path, the CM 3 transmits a request for changing the path to the sub-path in advance, to the host A51 or host B52 together with the above-mentioned request. These requests are transmitted in such a manner that they are added to a response to the path check information.

Next, whether CFL can be performed is checked. Whether there is an abnormality in the paths to the host A51 and host B52 is checked. For that purpose, whether there is a difference between the path table 14-0 retained by the CM 3-0 and the path table 14-1 retained by the CM 3-1 is checked. If there is a difference, this means that any of the paths will be cut off when any of the CMs 3 performs a version update. If it is determined that there is a difference, CFL will not be performed. However, if there is a maintenance worker, the determination whether to perform CFL may be left to the maintenance worker. If there is no difference, the firmware installed on the CM 3-0, for example, is updated.

Next, when the CM 3-0 is started after performing the version update, the path table 14-0 is empty, since the CM 3-0 has just been started. For this reason, in order to update path table 14-0 or path table 14-1, the CM 3-0 receives path check information for a while. Subsequently, whether the CM 3-1 can perform to replace the firmware with updated version is checked. The checking method is the same as the above-mentioned one, that is, whether there is a difference between the path table 14-0 of the CM 3-0 and the path table 14-1 of the CM 3-1 is checked.

If there is a difference, after the path table 14-0 and path table 14-1 are checked, if possible, the version number of the CM 3-0 that has first performed the version update may be automatically rolled back or the CM 3-1 may perform to replace the firmware with updated version. If there is a maintenance worker, the maintenance worker determines recovery method. For example, the latter part, CM 3-1, may perform to replace the firmware with updated version after the maintenance worker recovers the path.

If there is no difference, the latter part, CM 3-1, automatically perform to replace the firmware with updated version. Finally, the interval of transmission of path check information to the host A51 and host B52 is restored to the default. Thus, the CFL is completed.

As is understood from the above-mentioned description, if the storage apparatus 1 transmits the path identification information to the host A51 or host B52 and then receives the path identification information from the host A51 or host B52 via all paths other than the path through which the path identification information has been transmitted, it correctly detects whether the paths among the host A51 and host B52 and storage apparatus 1 are normal. As a result, the firmware installed on the storage apparatus 1 is automatically updated without having to stop processing an operation and without a maintenance worker having to perform an operation.

Figure 6A:
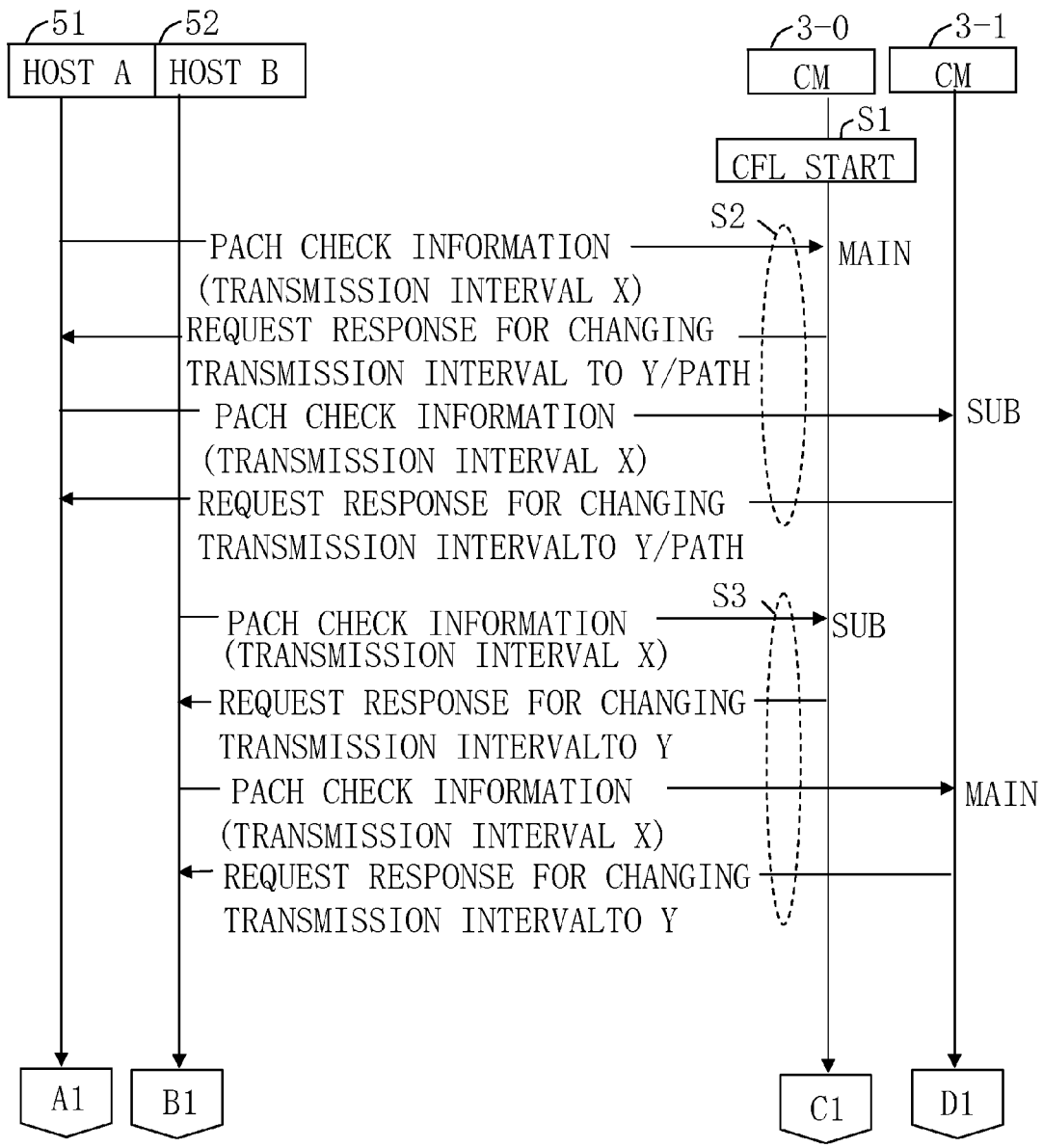
FIGS. 6A to 6F are a diagram illustrating an example of process sequence.
Figure 6B:
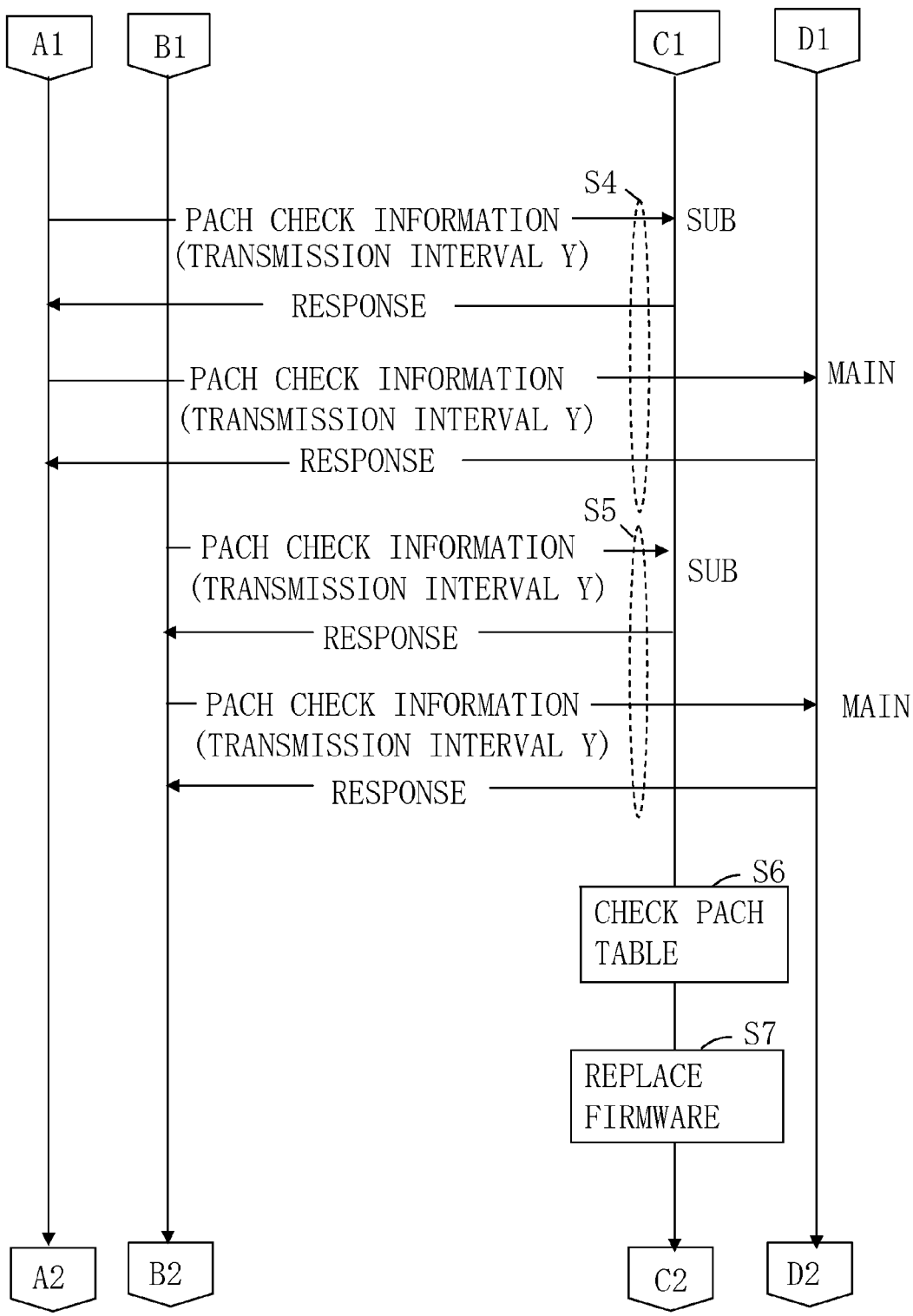

Next, CFL control will be described in detail. A normal sequence will be illustrated. FIGS. 6A and 6F are a diagram illustrating an example of process sequence. FIG. 6A illustrates step1 (S1) to step3 (S3) of the process sequence. When the CM 3-0 detects a CFL request, it starts CFL (S1). In this case, the path between the host A51 and CM 3-0 is the main path and the path between the host A51 and CM 3-1 is the sub-path. This is a default connection example.

First, the host A51 transmits path check information to the CM 3-0 at the transmission interval X. Then, the CM 3-0 adds, to a response to the path check information, a request for changing the transmission interval to a transmission interval Y, a request for changing the path to the sub-path, and path identification information "1001" created by the CM 3-0 and then returns the response to the CM 3-0. Simultaneously, the CM 3-0 stores "1001" as the SND-ID of the WWN-A in the path table 14-0.

Next, upon receipt of the response from the CM 3-0, the host A51 extracts the path check information "1001" therefrom. Then, the host A51 adds the path identification information "1001" to path check information and transmits the path check information to the CM 3-1 at the transmission interval X from the port B58.

Upon receipt of the path check information, the CM 3-1 adds, to a response to the path check information, a request for changing the transmission interval to the transmission interval Y, a request for changing the path to the main path, and path identification information "1101" created by the CM 3-1 and then returns the response to the host A51. Simultaneously, the CM 3-1 stores "1101" as the SND-ID of the WWN-B and "1001" as the RCV-ID thereof in the path table 14-1. Upon receipt of the response from the CM 3-1, next time the host A51 transmits the path check information to the CM 3-0, the host A51 adds the path identification information "1101" to path check information (S2).

On the other hand, the path between the host B52 and CM 3-0 is the sub-path and the path between the host B52 and CM 3-1 is the main path. This is a default connection example. Since the host B52 transmits path check information to the CM 3-0 at the transmission interval X, the CM 3-0 adds, to a response to the path check information, a request for changing the transmission interval to the transmission interval Y and path identification information "1002" created by the CM 3-0 and then returns the response to the host B52. Simultaneously, the CM 3-0 stores "1002" as the SND-ID of the WWN-C in the path table 14-0.

Next, upon receipt of the response from the CM 3-0, the host B52 extracts the path check information "1002" therefrom. Then, the host B52 adds the path identification information "1002" to path check information and transmits the path check information to the CM 3-1 at the transmission interval X from the port D60.

Upon receipt of the path check information, the CM 3-1 adds, to a response to the path check information, a request for changing the transmission interval to the transmission interval Y and path identification information "1102" created by the CM 3-1 and then returns the response to the host B52. Simultaneously, the CM 3-1 stores "1102" as the SND-ID of the WWN-D and "1002" as the RCV-ID thereof in the path table 14-1. On the other hand, next time the host B52 transmits the path check information to the CM 3-0, the host B52 adds the path identification information "1102" to path check information (S3). FIG. 6B illustrates step4 (S4) to step7 (S7) of the process sequence.

Since the host A51 transmits information where the path identification information "1101" has been added to path check information, to the CM 3-0 at the transmission interval Y, the CM 3-0 adds, to a response to the information, the path identification information "1001" created by the CM 3-0 and returns the response to the host A51. At that time, the CM 3-0 stores "1001" as the SND-ID of the WWN-A and "1101" as the RCV-ID thereof in the path table 14-0.

Next, upon receipt of the response from the CM 3-0, the host A51 extracts the path check information "1001" therefrom. Then, the host A51 adds the path identification information "1001" to path check information and transmits the path check information to the CM 3-1 at the transmission interval Y.

Upon receipt of the path check information, the CM 3-1 adds, to a response to the path check information, the path identification information "1101" and returns the response to the CM 3-1. Simultaneously, the CM 3-1 stores "1101", as the SND-ID of the WWN-B and "1001" as the RCV-ID thereof in the path table 14-1. On the other hand, upon the host A51 receives the response from the CM 3-1, next time the host A51 transmits the path check information to the CM 3-0, the host A51 adds the path identification information "1101" to path check information (S4).

Since the host B52 transmits path check information including the path identification information "1102" to the CM 3-0 at the transmission interval Y, the CM 3-0 adds, to a response to the path check information, the path identification information "1002" and then returns the response to the CM 3-0. At that time, the CM 3-0 stores "1002" as the SND-ID of the WWN-C and "1102" as the RCV-ID thereof in the path table 14-0.

Next, upon receipt of the response from the CM 3-0, the host B52 extracts the path check information "1002" therefrom. Then, the host B52 adds the path identification information "1002" to path check information and transmits the path check information to the CM 3-1 at the transmission interval Y. Upon receipt of the path check information, the CM 3-1 adds, to a response to the path check information, the path identification information "1102" created by the CM 3-1 and then returns the response to the host B52. Simultaneously, the CM 3-1 stores "1102" as the SND-ID of the WWN-D and "1002" as the RCV-ID thereof in the path table 14-1. On the other hand, next time the host B52 transmits the path check information to the CM 3-0, the host B52 adds the path identification information "1102" to path check information (S5). As a result, the contents of the path table 14-0 and 14-1 are updated. Next, the updated path table is checked (S6). One example is the state illustrated in FIG. 5A. In this example, the path table 14-0 and the path table 14-1 are matched; therefore, the CM 3-0 replaces the firmware with updated version (S7).

Figure 6C:
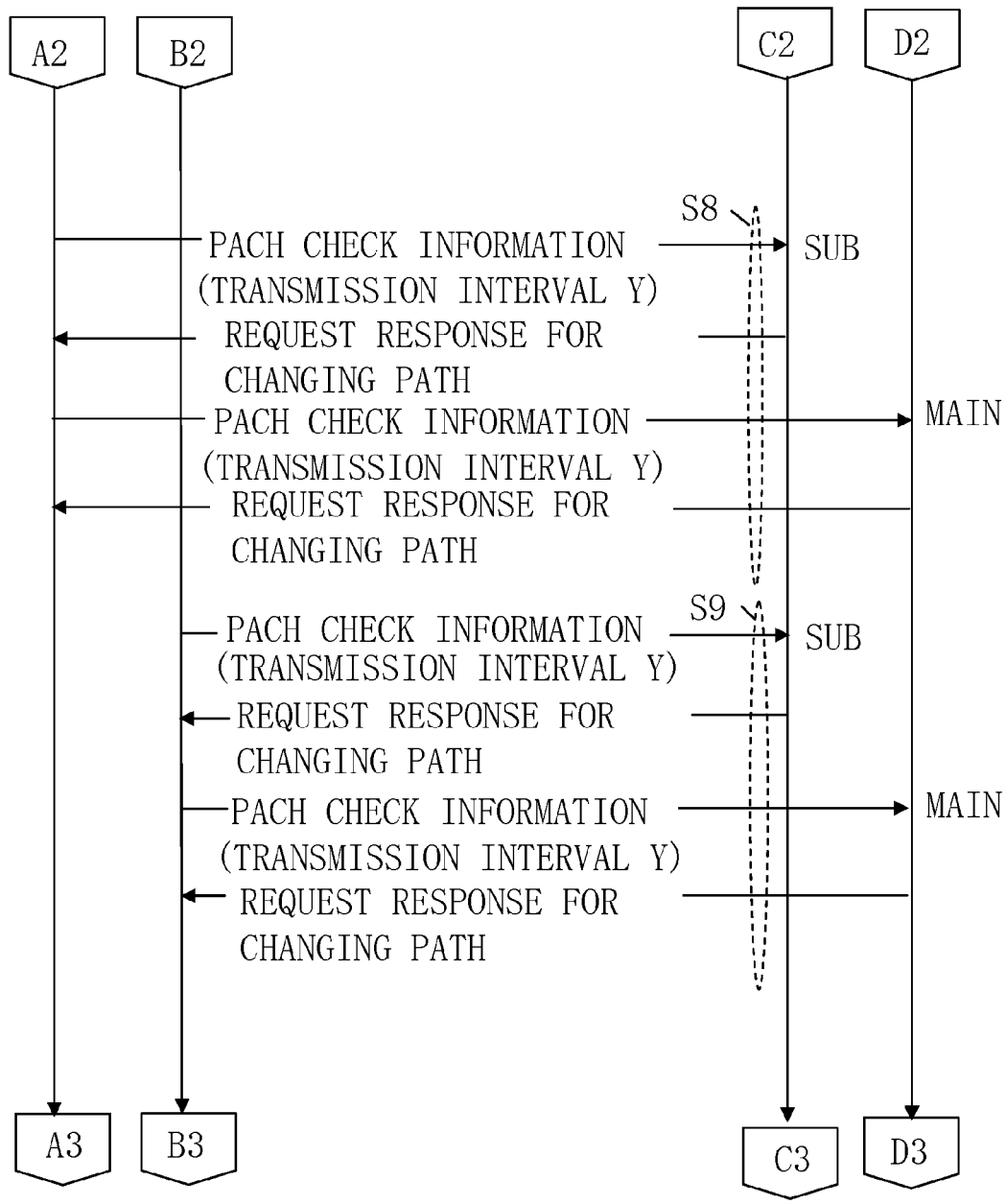

FIG. 6C illustrates step8 (S8) and step9 (S9) of the process sequence. Hereafter, the transmission or reception of path identification information will not be described. After the CM 3-0 performs the version update of the firmware, the CM 3-0 and CM 3-1 each receive path check information from the host A51 at the transmission interval Y, and make a request for changing the main path and transmit response to the host A51 (S8). On the other hand, when the CM 3-0 and CM 3-1 each receive path check information from the host B52 at the transmission interval Y, they each make a request for changing the main path and transmit response to the host B52 (S9).

Figure 6D:
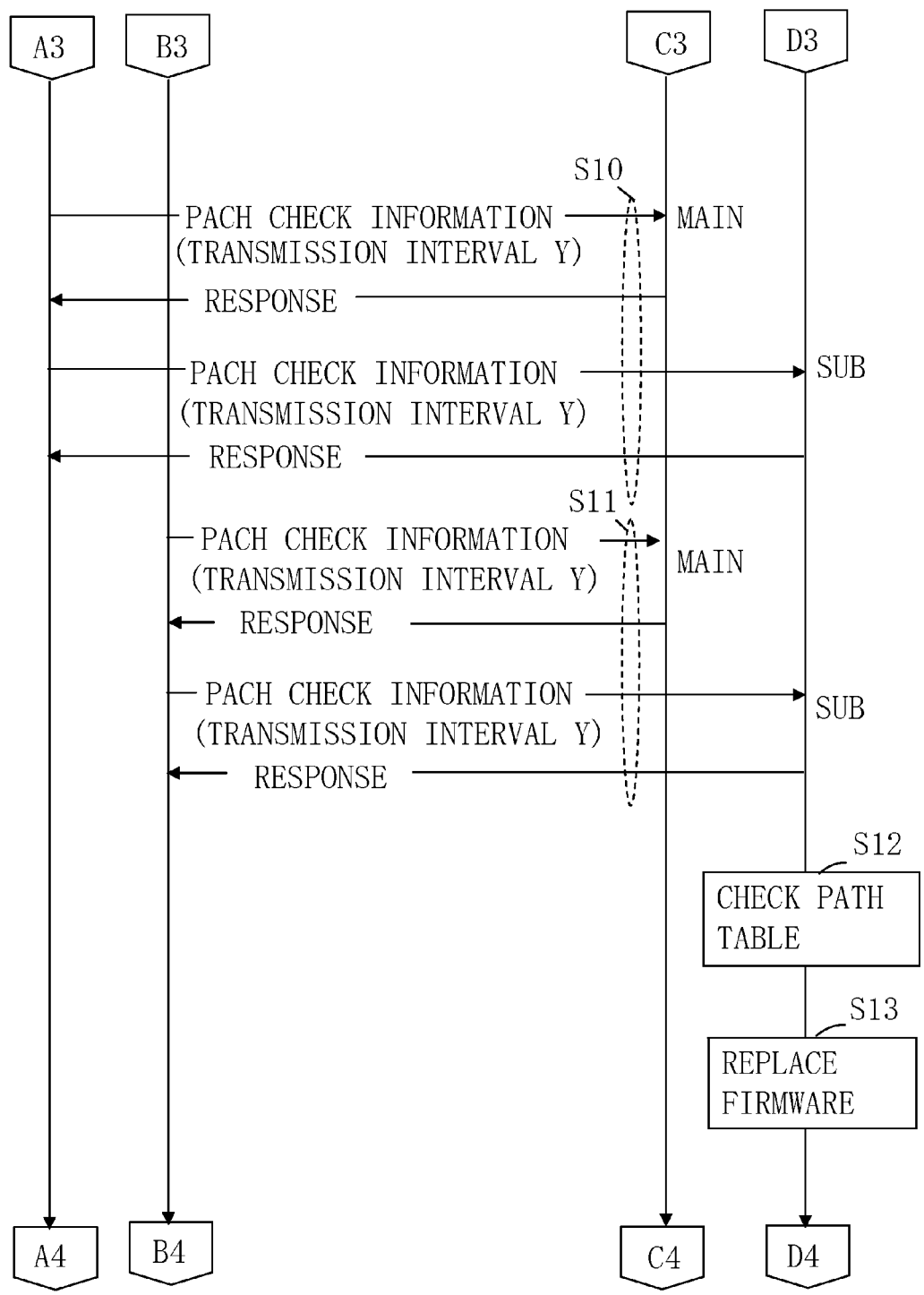

FIG. 6D illustrates step10 (S10) to step13 (S13) of the process sequence. Subsequently, the CM 3-0 receives path check information as the main path from the host A51 at the transmission interval Y; the CM 3-1 receives path check information as the sub-path therefrom at the transmission interval Y, and they transmit response to the host A51 (S10). Also, the CM 3-0 receives path check information as the main path from the host B52; the CM 3-1 receives path check information as the sub-path at the transmission interval Y, and they transmit response to the host B52 (S11). Thus, the latest state of the path table 14-0 and the path table 14-1 is acquired. Then, whether the path table 14-0 and path table 14-1 are matched is checked (S12). If the path tables are matched, the CM 3-1 replaces the firmware with updated version (S13).

Figure 6E:
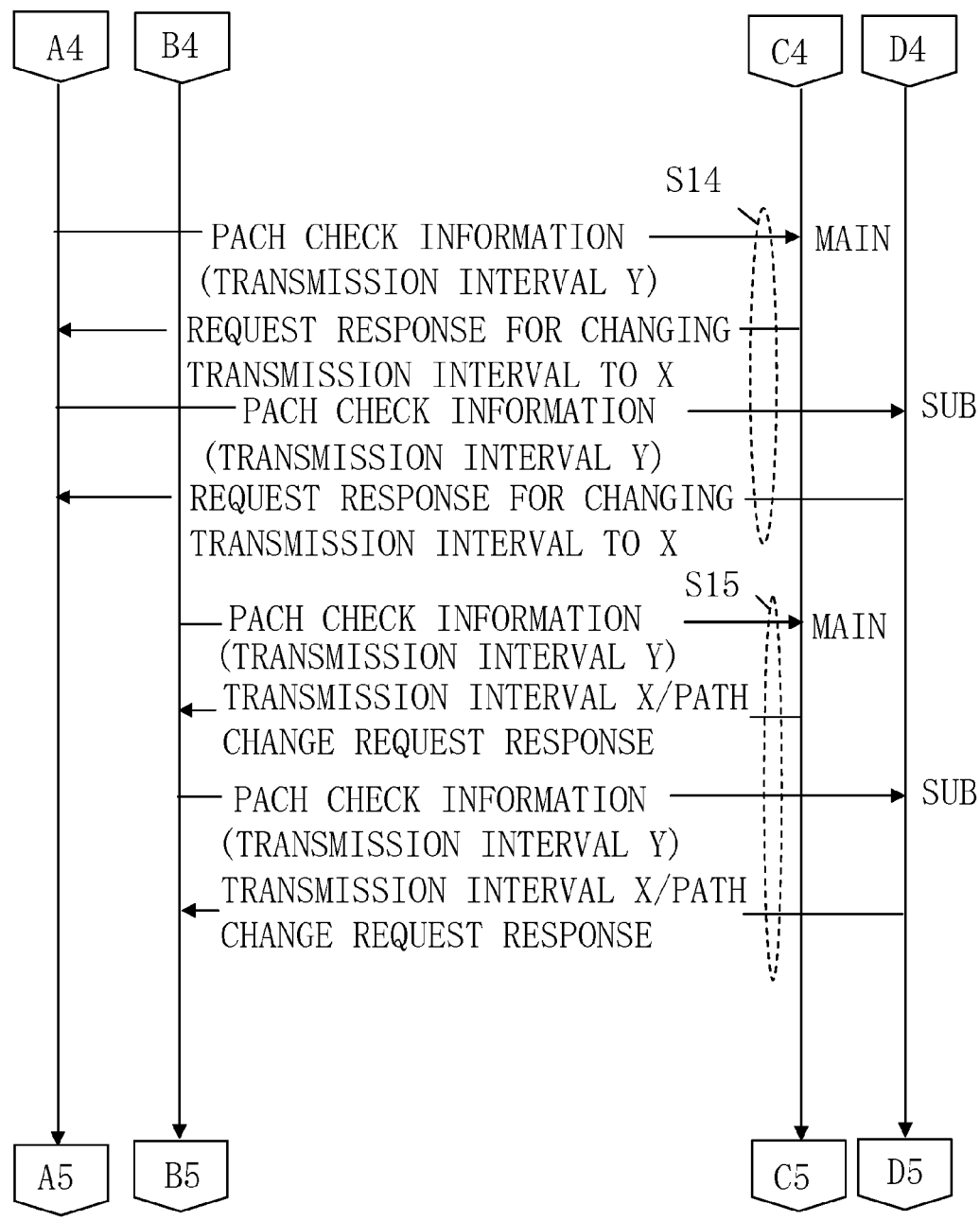
Figure 6F:
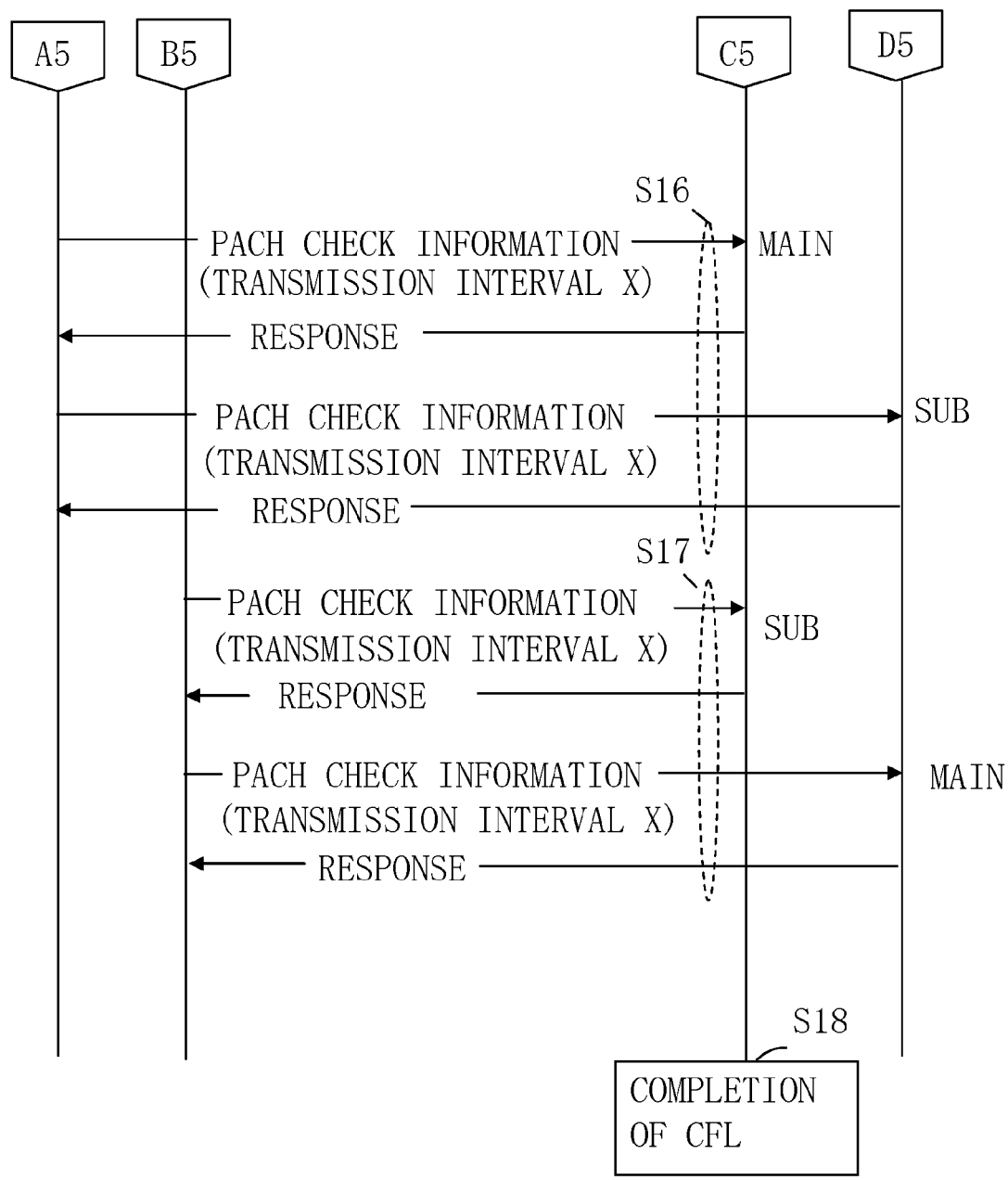

FIG. 6E illustrates step14 (S14) and step15 (S15) of the process sequence.

After the CM 3-1 performs the version update of the firmware, the CM 3-0 and CM 3-1 each receive path check information from the host A51 at the transmission interval Y and makes a request for changing the transmission interval to the transmission interval X, and transmit response to the host A51 (S14).

On the other hand, when the CM 3-0 and CM 3-1 each receive path check information from the host B52 at the transmission interval Y, they each makes a request for changing the transmission interval to the transmission interval X and a request for changing the main path, and transmit response to the host B52 (S15).

FIG. 6F illustrates step16 (S16) to step18 (S18) of the process sequence. Subsequently, the CM 3-0 and CM 3-1 each receive path check information from the host A51 at the transmission interval X, and transmit response to the host A51 (S16). Also, the CM 3-0 receives path check information as the sub-path from the host B52 at the transmission interval X; the CM 3-1 receives path check information as the main path therefrom at the transmission interval X, and they transmit response to the host B52 (S17). Thus, the CFL is completed (S18).

Figure 7A:
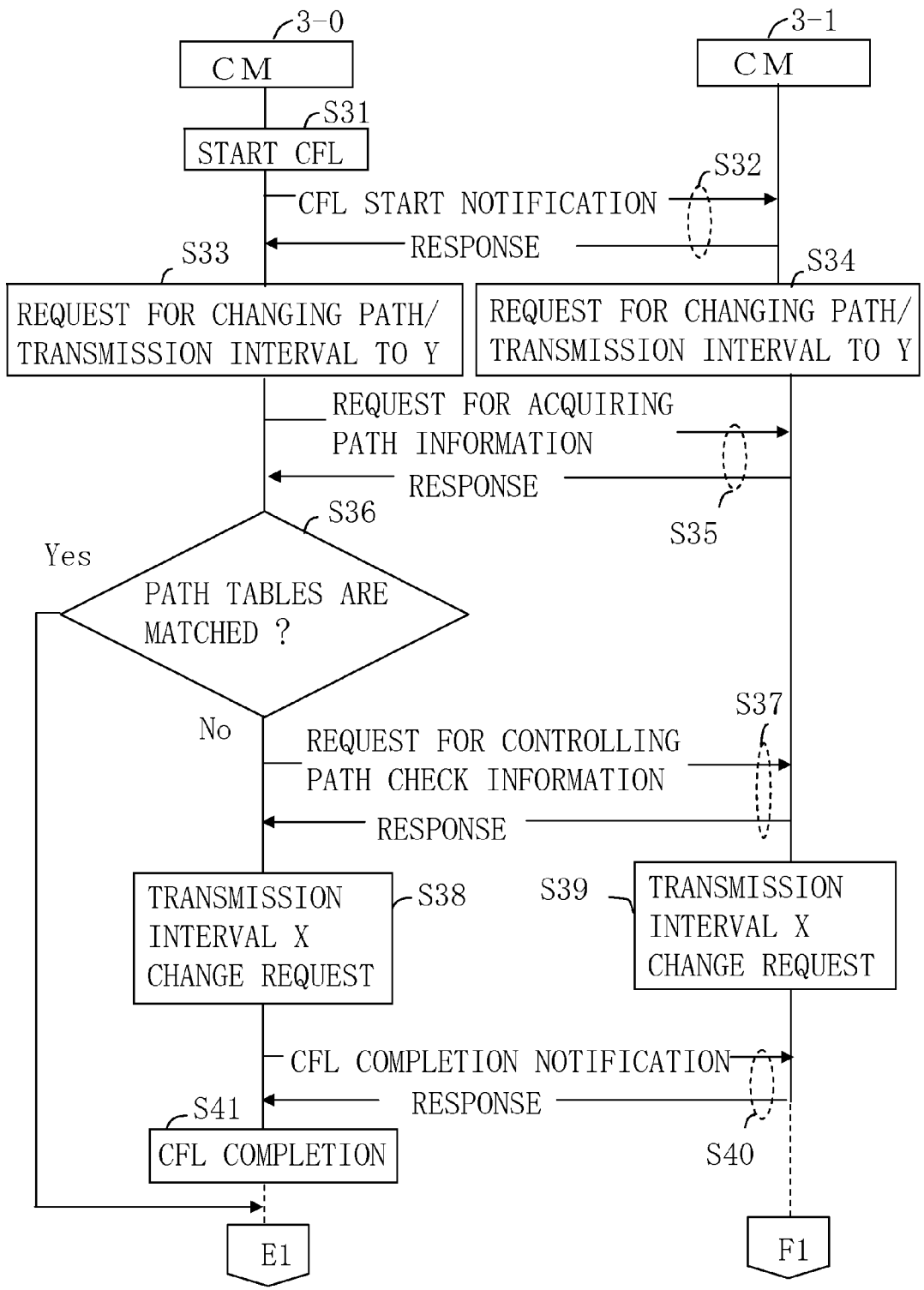
FIG. 7A to 7D are a diagram illustrating an example of process sequence between the CMs.

FIGS. 7A TO 7D illustrate an example of process sequence between CMs. FIG. 7A illustrates step31 (S31) to step41 (S41) of the process sequence. First, the CM 3-0 starts CFL (S31). Then, the CM 3-0 provides notification about the start of the CFL to the CM 3-1. The CM 3-1 receives the CFL start notification and returns, to the CM 3-0, a response to the notification (S32). Subsequently, when the CM 3-0 receives path check information from the host A51, it makes a request for changing the transmission interval to the transmission interval Y and a request for changing the main path, to the host A51. Also, when the CM 3-0 receives path check information from the host B52, it makes a request for changing the transmission interval to the transmission interval Y, to the host B52 (S33).

Also, when the CM 3-1 receives path check information from the host A51, it makes a request for changing the transmission interval to the transmission interval Y and a request for changing the main path, to the host A51. Also, when the CM 3-1 receives path check information from the host B52, it makes a request for changing the transmission interval to Y, to the host B52 (S34).

Subsequently, the CM 3-0 and CM 3-1 each updates the path table 14-0 or the path table 14-1 on the basis of the path check information received from the host A51 or host B52. Subsequently, when the CM 3-0 makes, to the CM 3-1, a request for acquiring path information, the CM 3-1 returns the contents of the path table 14-1 to the CM 3-0 (S35). The CM 3-0 checks whether the path table 14-0 and path table 14-1 are matched (S36). If the path table 14-0 and path table 14-1 are not matched, the CM 3-0 makes, to the CM 3-1, a request for controlling path check information so as to restore the transmission interval of the CM 3-1 to X. Subsequently, the CM 3-0 receives a response from the CM 3-1 (S37).

The CM 3-0 makes, to the host A51 and host B52, a request for changing the path check information transmission interval to X (S38). The CM 3-1 makes, to the host A51 and host B52, a request for changing the path check information transmission interval to X (S39). The CM 3-0 provides notification about the completion of the CFL to the CM 3-1. The CM 3-1 receives the CFL completion notification and makes a response indicating that it has received the notification (S40). Thus, the CM 3-0 completes the CFL (S41).

Figure 7B:
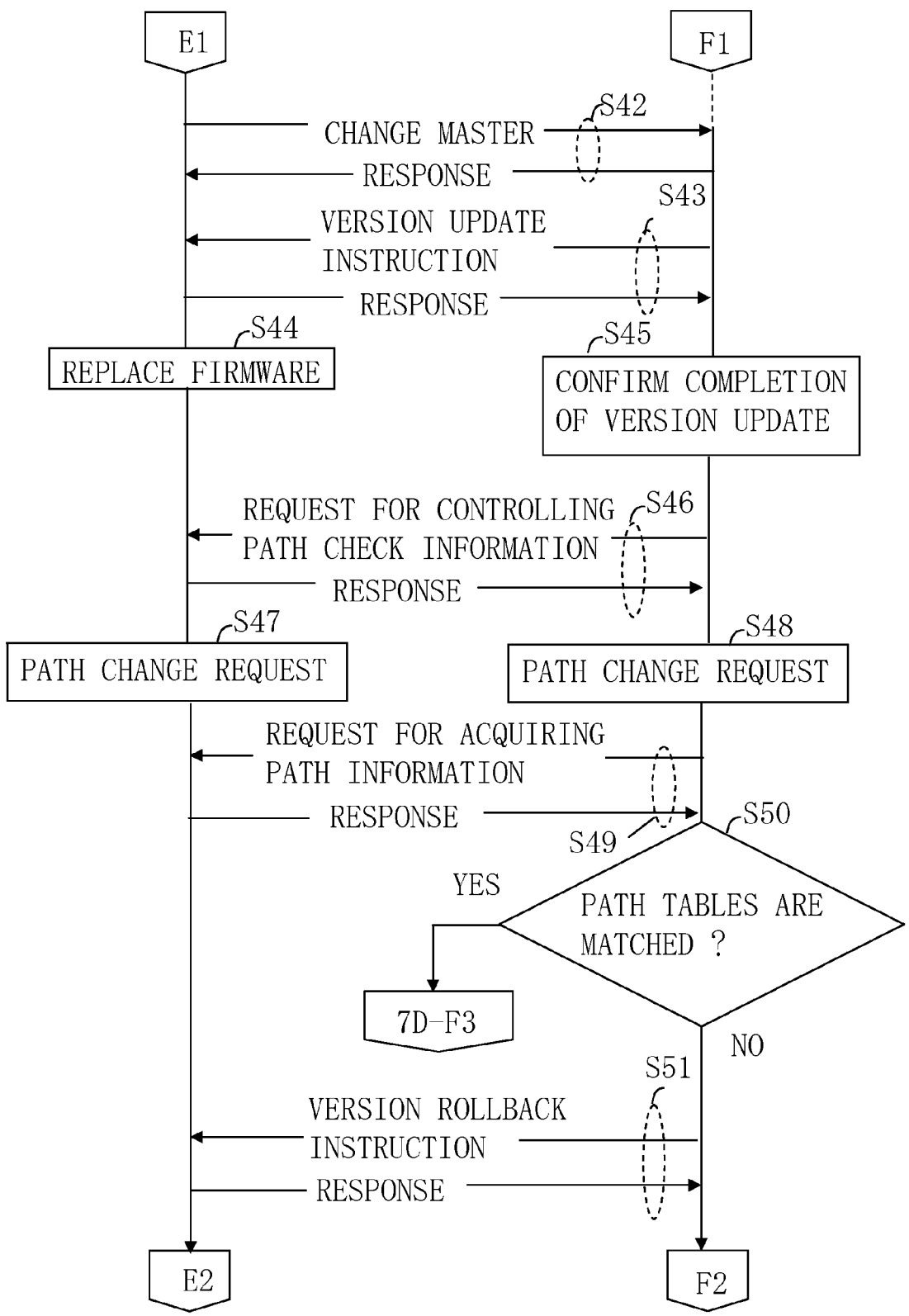

FIG. 7B illustrates step42 (S42) to step51 (S51) of the process sequence. On the other hand, if the path table 14-0 and path table 14-1 are matched, the CM 3-0 makes a request for changing the master, to the CM 3-1 and receives a response therefrom (S42). Subsequently, when the master is changed from the CM 3-0 to the CM 3-1, the CM 3-1 makes a version update instruction to the CM 3-0. The CM 3-0 makes a response indicating that it has received the instruction, to the CM 3-1 (S43).

The CM 3-0 replaces the firmware with updated version in accordance with the version update instruction (S44). Subsequently, the CM 3-1 controls the version update state of the CM 3-0 and confirms that the version update has been completed (S45). Subsequently, the CM 3-1 makes, to the CM 3-0, a request for controlling path check information with respect to a path change request. Then, the CM 3-0 makes a response to the CM 3-1 (S46). Subsequently, when the CM 3-0 receives path check information from the host A51 or host B52, it makes a request for changing the main path (S47) thereto.

Also, when the CM 3-1 receives path check information from the host A51 or host B52, it makes a request for changing the main path thereto (S48). Subsequently, the CM 3-0 and CM 3-1 each updates the path table 14-0 or the path table 14-1 on the basis of the path check information received from the host A51 or host B52. Subsequently, the CM 3-1 makes, to the CM 3-0, a request for acquiring path information. The CM 3-0 returns the contents of the path table 14-0 to the CM 3-1 (S49). Then, the CM 3-1 checks whether the path table 14-0 and path table 14-1 are matched (S50). If the path tables are not matched, the CM 3-1 makes, to the CM 3-0, an instruction for rolling the firmware of the version number back to the firmware of the previous number and receives a response from the CM 3-0 (S51).

Figure 7C:
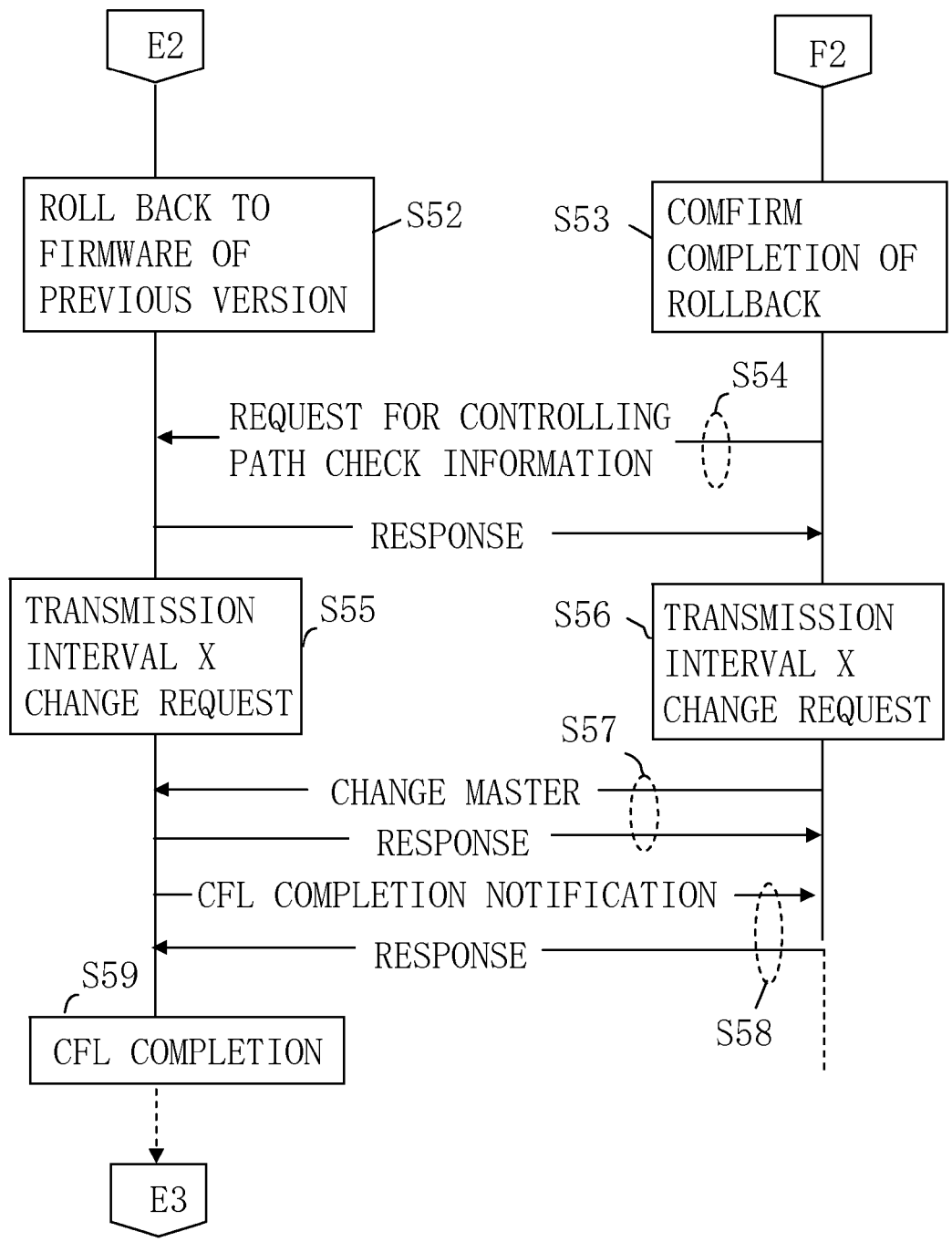

FIG. 7C illustrates step52 (S52) to step59 (S59) of the process sequence. Then, the CM 3-0 rolls the version number back to the previous version number (S52). Subsequently, the CM 3-1 checks whether the rollback has been completed and confirms the completion of the rollback (S53). Subsequently, the CM 3-1 makes, to the CM 3-0, a path check information control request for changing the transmission interval to X. Then, the CM 3-0 makes a response indicating that it has received the request, to the CM 3-1 (S54). Subsequently, when the CM 3-0 receives path check information from the host A51 or host B52, it makes a request for changing the path check information transmission interval to X thereto (S55).

Also, when the CM 3-1 receives path check information from the host A51 or host B52, it makes a request for changing the path check information transmission interval to X thereto (S56). Subsequently, the CM 3-1 makes a request for changing the master, to the CM 3-0 and receives a response therefrom (S57). Subsequently, when the master is changed from the CM 3-1 to the CM 3-0, the CM 3-0 provides notification about the completion of the CFL to the CM 3-1. The CM 3-1 makes a response to the CM 3-0 (S58) and completes the process. Thus, the CM 3-0 completes the CFL (S59).

Figure 7D:
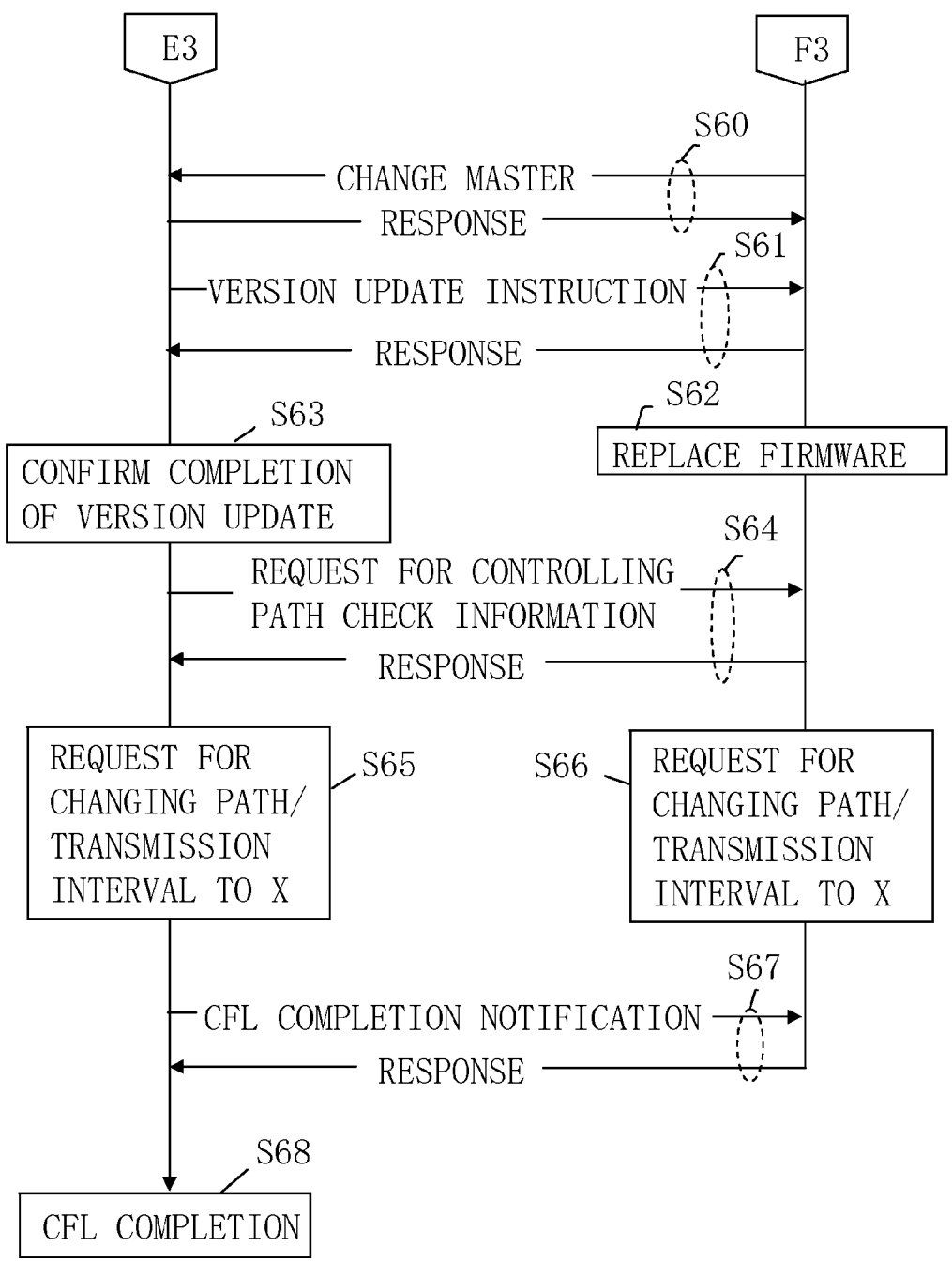

FIG. 7D illustrates step60 (S60) to step68 (S68) of the process sequence. On the other hand, if the contents of the path table 14-0 and those of the path table 14-1 are matched, the CM 3-1 makes a request for changing the master, to the CM 3-0 and receives a response therefrom (S60). Subsequently, when the master is changed from the CM 3-1 to the CM 3-0, the CM 3-0 makes a version update instruction to the CM 3-1. The CM 3-1 makes a response indicating that it has received the instruction, to the CM 3-0 (S61). Then, the CM 3-1 replaces the firmware with updated version (S62). Subsequently, the CM 3-0 checks whether the version update has been completed and confirms the completion of the version update (S63).

Then, the CM 3-0 makes a path check information control request for changing the transmission interval to X, to the CM 3-1. The CM 3-1 makes a response indicating that it has received the request, to the CM 3-0 (S64). Subsequently, when the CM 3-0 receives path check information from the host A51, it makes a request for changing the path check information transmission interval to X, to the host A51. Also, when the CM 3-0 receives path check information from the host B52, it makes a request for changing the path check information transmission interval to X and a request for changing the main path, to the host B52 (S65).

Also, when the CM 3-1 receives path check information from the host A51, it makes a request for changing the path check information transmission interval to X, to the host A51. Also, when the CM 3-1 receives path check information from the host B52, it makes a request for changing the path check information transmission interval to X and a request for changing the main path (S66), to the host B52. Subsequently, the CM 3-0 provides notification about the completion of the CFL to the CM 3-1. Then, the CM 3-1 completes the CFL process and makes a response indicating that it has received the notification, to the CM 3-0 (S67). Thus, the CM 3-0 completes the CFL (S68).

Figure 8A:
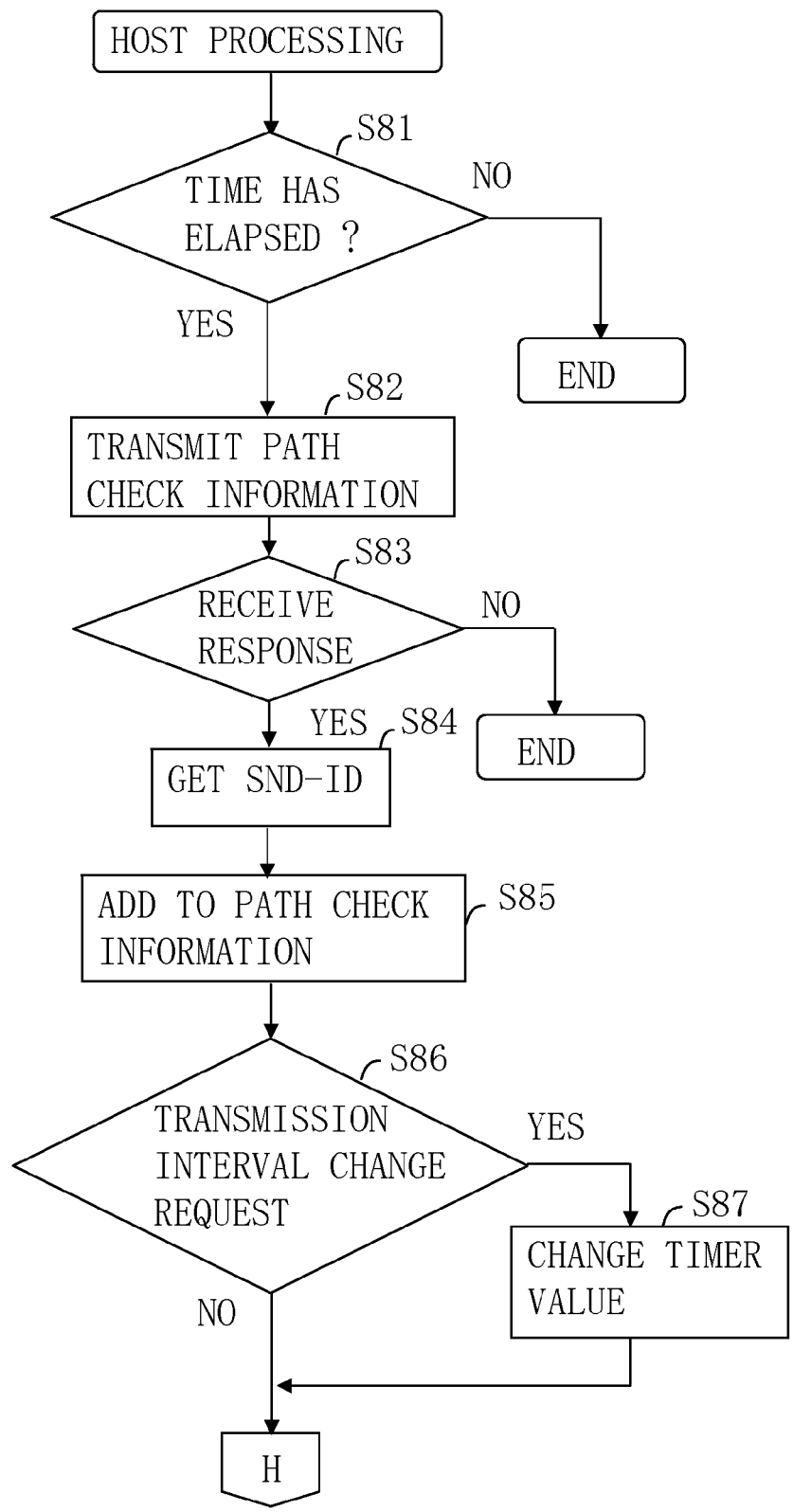
FIGS. 8A and 8B are a diagram illustrating the flow of processing of path check information performed by hosts.
Figure 8B:
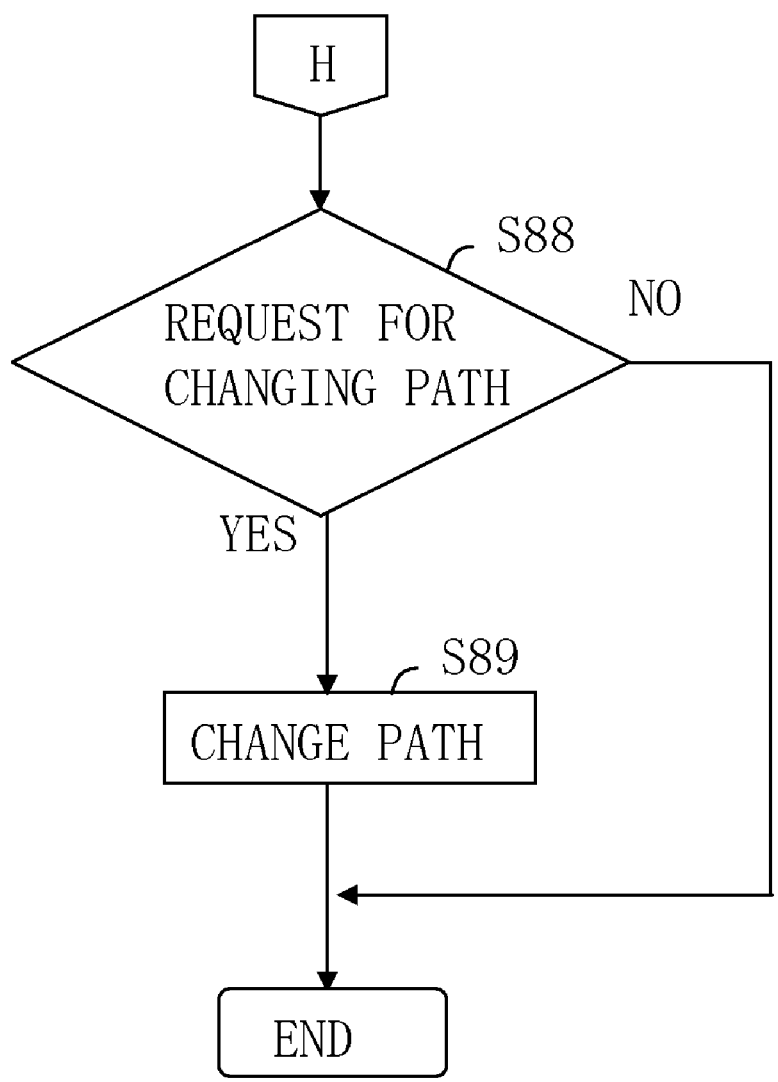

FIGS. 8A and 8B illustrate the flow of processing of path check information performed by the hosts. Here, it is assumed that the host A51 and host B52 each have a timer for each path and that each timer is set in advance. First, the host A51 or host B52 (hereafter referred to as the host) checks whether a specified path check information transmission interval of time has elapsed. The initial value is the transmission interval X (S81). If the transmission interval has not elapsed yet, the host completes the process. If the transmission interval has elapsed, the host sets the timer and transmits path check information to the storage apparatus 1 (S82). Subsequently, the host receives a response from the storage apparatus 1 (S83). Then, the host gets path identification information from the response (S84). Subsequently, the host adds the extracted path identification information to path check information for checking another path (S85).

Then, the host checks whether the response includes a request for changing path check information transmission interval (S86). If the change request is included, the host changes the timer value to a specified value (S87). Subsequently, the host checks whether the response includes a request for changing the main path (S88). If the change request is included, the host changes the main path (S89). If there is no response from the storage apparatus 1, the host completes the process.

Figure 9:
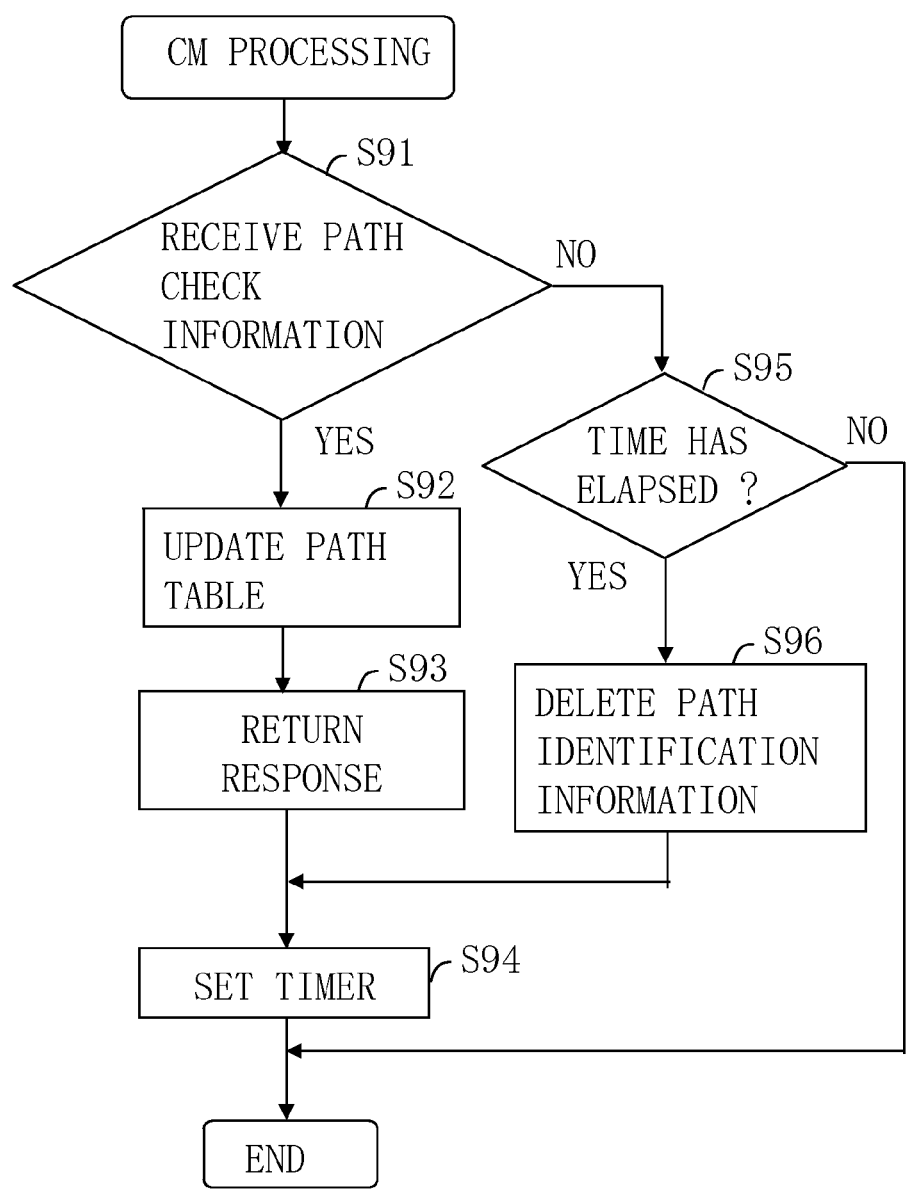
FIG. 9 is a diagram illustrating the flow of processing of path check information performed by the CMs.

FIG. 9 illustrates the flow of processing of path check information performs by the CMs. First, the storage apparatus 1 checks whether path check information has been received (S91). If path check information has been received, the storage apparatus 1 updates the path table 14-0 or the path table 14-1 (S92). Subsequently, the storage apparatus 1 adds path identification information to a response and returns the response. If CFL is being performed, the storage apparatus 1 may add, to the response, a request for changing the path check information transmission interval and a request for changing the main path received from the host A51 or host B52 in addition to the path identification information (S93).

Subsequently, the storage apparatus 1 sets a path check information transmission interval at a timer (94). If no path check information has been received, the storage apparatus 1 checks whether the time has elapsed (S95). If the timer has expired, the storage apparatus 1 deletes the relevant path identification information from the path table 14-0 or the path table 14-1 (S96).

As is understood from the above description, since the firmware is replaced in a hot swapping manner on the basis of the path table 14-0 and the path table 14 about the connection path from the host A51 or host B52, a stop of an operation between the host A51 or host B52 and storage apparatus 1 is avoided. Also, the maintenance worker does not need to check the state of the path between the host A51 or host B52 and storage apparatus 1. This reduces the load placed on the maintenance worker.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A storage system comprising:
a host; and
a storage apparatus connected to the host via first and second paths and including a plurality of pieces of firmware corresponding to a plurality of paths connecting with the host, the host including:
   a receiving unit to receive first path identification information via the first path from the storage apparatus and to receive second path identification information via the second path from the storage apparatus;
   a transfer unit to transfer the first path identification information and the second path identification information to the storage apparatus; and
   a control unit to control transfer of the received first path identification information to the storage apparatus via the second path and to transfer the received second path identification information to the storage apparatus via the first path,
the storage apparatus including:
   a transmission unit to transmit the first path identification information to the host via the first path and to transmit the second path identification information to the host via the second path;
   a reception unit to receive the second path identification information from the host via the first path and to receive the first path identification information form the host via the second path;
   a path table memory including first and second path tables, the first path table storing the transmitted first path identification information and the received second path identification information with respect to the first path, the second path table storing the transmitted second path identification information and the received first path identification information with respect to the second path;
   a request reception unit to receive the pieces of firmware for replacement and a request to replace the pieces of firmware;
   a determination unit to determine whether the first path identification information matches between the path tables and whether the second path identification information matches between the path tables, upon receiving the replacement request; and
   a replacement controller to sequentially replace the pieces of firmware corresponding to each of the paths in a hot swapping manner, when the determination unit determines that the first path identification information matches between the path tables and that the second path identification information matches between the path tables.

2. The storage system according to claim 1, wherein the host periodically notifies the storage apparatus of path check information for checking a state of the path, wherein the storage apparatus adds the first or second path identification information to a response to the notification about the path check information received from the host, and the storage apparatus transmits the response.

3. The storage system according to claim 2, wherein the host adds the first or second path identification information received from the storage apparatus to the path check information, and the host transmits the path check information to the storage apparatus via the path other than the path of the received first or second path identification information.

4. The storage system according to claim 2, wherein the storage apparatus adds information requesting reduction in an interval of transmission of the path check information, to a response to the path check information received from the host.

5. The storage system according to claim 2, wherein the storage apparatus adds information requesting change of a path, to a response to the path check information received from the host.

6. A storage apparatus connected to the host via first and second paths including a plurality of pieces of firmware corresponding to paths connecting with a host, the storage apparatus comprising:
   a transmission unit to transmit first path identification information to the host via the first path and transmitting second path identification information to the host via the second path;
   a reception unit to receive the second path identification information from the host via the first path and to receive the first path identification information from the host via the second path;
   a path table memory including first and second path tables, the first path table storing the transmitted first path identification information and the received second path identification information with respect to the first path, the second path table storing the transmitted second path identification information and the received first path identification information with respect to the second path;
   a request reception unit to receive the pieces of firmware for replacement and a request to replace the pieces of firmware;
   a determination unit to determine whether the first path identification information matches between the path tables and whether the second path identification information matches between the path table, upon receiving the replacement request; and
   a replacement controller to sequentially replace the pieces of firmware corresponding to each of the paths in a hot swapping manner, when the determination unit determines that the first path identification information matches between the path tables and that the second path identification information matches between the path tables.

7. A method for, in a storage apparatus connected to the host via first and second paths and including a plurality of pieces of firmware corresponding to a plurality of paths connecting with a host, replacing the firmware in a hot swapping manner, the method comprising:
   transmitting first path identification information to the host via the first path;
   receiving the first path identification information from the host via the second path;
   transmitting second path identification information to the host via the second path;
   receiving the second path identification information from the host via the first path;
   storing the transmitted first path identification information and the received second path identification information with respect to the first path into a first path table;
   receiving replacement firmware and a request for replacing the pieces of firmware;
   determining whether the first identification information matches between the path tables and whether the second path identification information matches between the path tables, upon receiving the replacement request; and replacing sequentially the pieces of firmware corresponding to each of the paths in a hot swapping manner, when the determining step determines that the first path identification information matches between the path tables and that the second path identification information matches between the path tables.

* * * * *

UNITED STATES PATENT AND TRADEMARK OFFICE
CERTIFICATE OF CORRECTION

PATENT NO.        : 8,010,713 B2
APPLICATION NO.   : 12/548024
DATED             : August 30, 2011
INVENTOR(S)       : Tadashi Matumura et al.

It is certified that error appears in the above-identified patent and that said Letters Patent is hereby corrected as shown below:

Column 14, Line 39, In Claim 6, delete "table," and insert --tables,--, therefor.

Signed and Sealed this
Eighth Day of November, 2011

David J. Kappos
*Director of the United States Patent and Trademark Office*